United States Patent Office 3,492,326
Patented Jan. 27, 1970

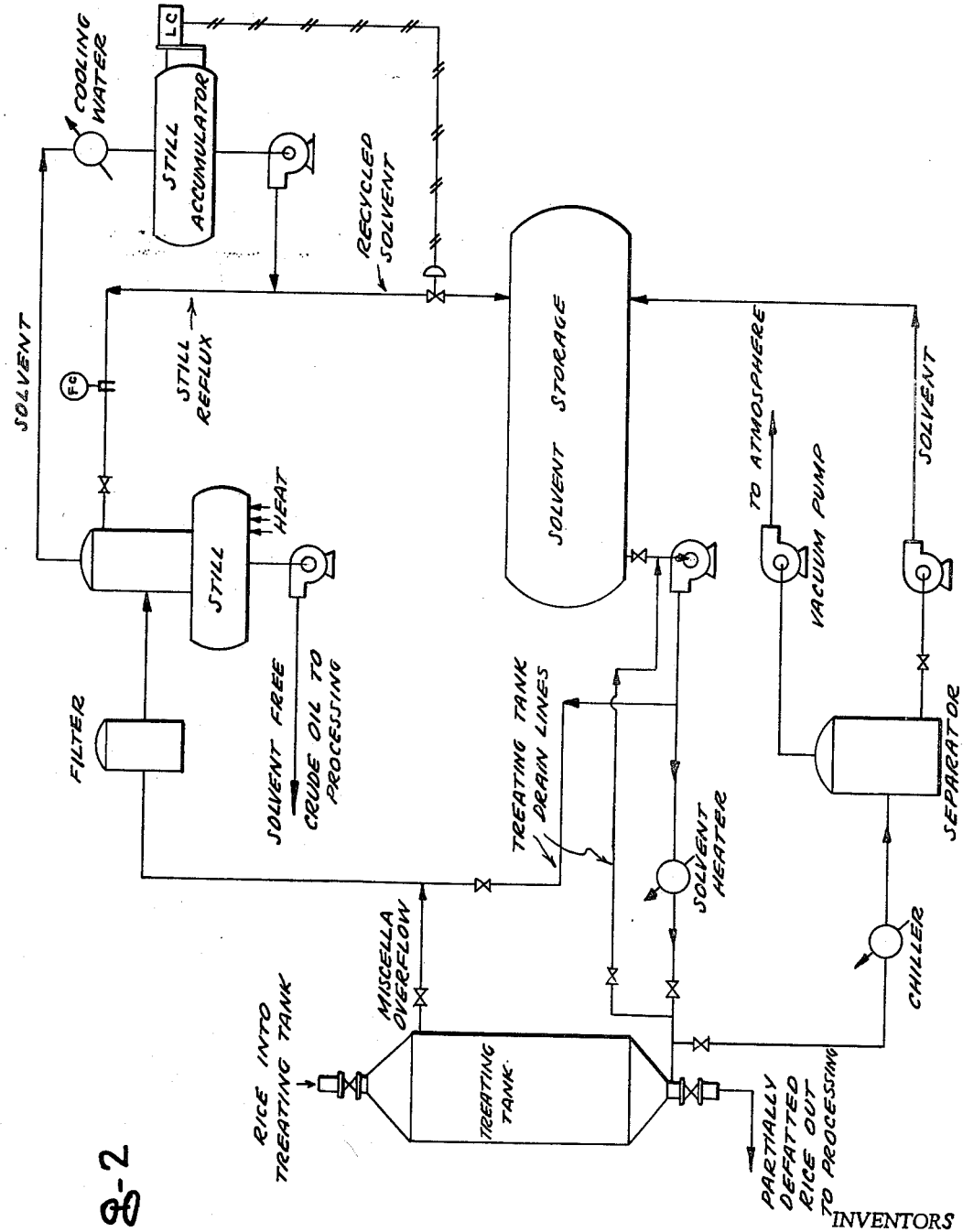

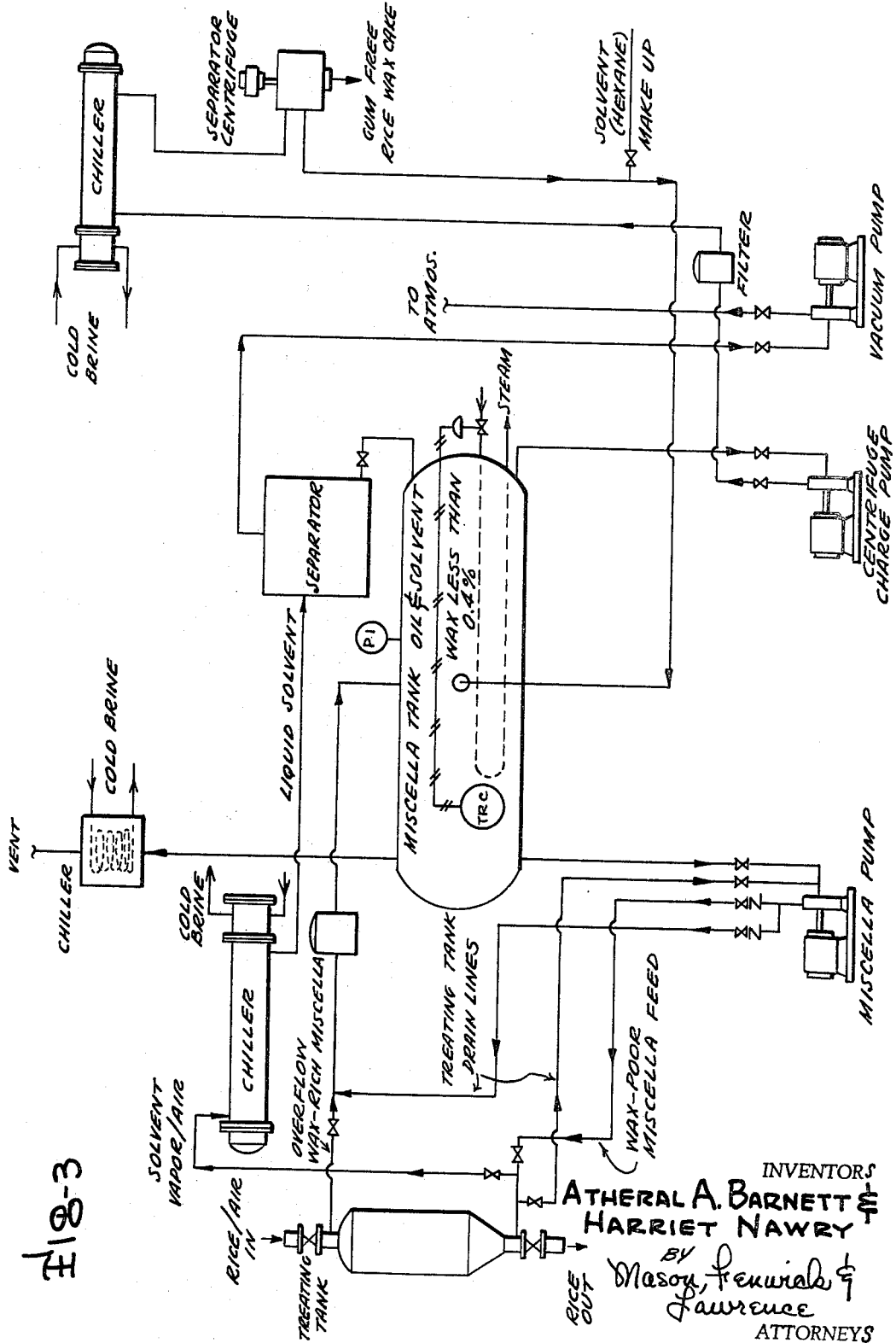

3,492,326
RICE PROCESSING AND PRODUCTION OF RICE OIL AND RICE WAX
Atheral A. Barnett and Harriet Nawry, Houston, Tex., assignors to Comet Rice Mills, Inc., Dallas, Tex., a corporation of Texas
Filed June 28, 1966, Ser. No. 561,230
Int. Cl. C11b 1/10
U.S. Cl. 260—412.4           18 Claims

ABSTRACT OF THE DISCLOSURE

The process of separating the rice wax from the rice gums in brown rice grains having a bran coating thereon comprising forming a vacuum around each brown rice grain to evacuate the interstices and voids of said grain, contacting the rice grains with the liquid extracting medium for said wax, the liquid extracting medium being hexane, butane, pentane, or other hydrocarbon solvents or a miscella having not more than 0.4% by weight rice wax, at a temperature and for a time suitable to extract not more than 10% of the fat fraction present in the rice grains to form a wax-rich miscella including a substantial portion of all the waxes present in the rice grains, and separating the wax from the miscella to form a gum-free wax.

A miscella for use in selectively extracting rice wax from brown rice comprising a solvent such as hexane, butane, and pentane, or other hydrocarbon solvent for the rice oil and rice wax and the brown rice grains, and up to 10% by weight of rice oil, preferably 4 to 7% by weight, and rice wax is an amount not greater than 0.4% by weight, preferably 0.2 to 0.3% by weight of the miscella.

---

This invention relates to rice processing. More particularly, the present invention is concerned with the processing of rice of all varieties to obtain rice oil and rice wax and an easily millable brown rice.

The rice processing industry, similar to other industries today, has found itself confronted with rising costs and little opportunity to increase the price of the rice product. Actually, competition in the food industry is so severe that manufacturers, in order to maintain a profit margin, have been forced to develop integrated manufacturing complexes, wherein they recover various by-products that may have been discarded or not used to their fullest extent in the past.

Heretofore rice processing was substantially confined to producing a rice product in the form of a kernel. While it was known that brown rice contained rice wax and rice oil, the industry never produced any significant amounts of either the oil or the wax.

It is manifest that great economies in the rice processing industry can be attained if it were feasible to produce not only the usual white rice product, but also (a) a quality grade of rice oil, (b) a hard rice wax, and (c) a more easily millable brown rice so as to produce the commercially used white rice. The present invention will deal separately with each of the above, since it is the primary object of the present invention to produce all three products.

RICE WAX

In the past there has never been any successful commercial effort to produce rice wax in the United States. Attempts to remove the rice wax from a crude rice oil obtained by conventional solvent extraction proved extremely difficult for at least two important reasons:

(1) The amount of wax—usually about 5%—was extremely small in comparison with the remaining amount of oil in the crude rice oil, and (2) The extraction of the crude rice oil naturally included gums which are intimately mixed and associated with the oil.

With a mixture of rice oil, wax, and gums, the removal of the wax by selective solvent extraction is not economically feasible because of the similar solubilities of wax and gums.

Filtration of the wax from the crude rice oil, including a chilling to precipitate the wax, was found to be virtually impossible, because the wax, being so intimately mixed with the oil and gum, failed to crystallize properly. Even in a slow chilling procedure, any wax crystals that settled on a filter are found to be small particles and are more aptly described as amorphous in form rather than crystals. These amorphous particles are believed to be formed through the partial hydrolysis of the gums in the crude oil which prevents the formation of adequate wax crystals, and when filtered, settle down on the filter against each other, tightly closing the pores of the filter media and substantially blocking passage of the oil through the filter. The wax then is not free of oil and, more importantly, contains the gums present in the oil.

The wax, when containing gums, never really hardens properly, but rather is quite tacky. It lacks luster, has a sticky feel, leaving finger prints, and is without hardness, which is a recognized standard for wax. Rice wax containing gums is a totally unsatisfactory commercial product and cannot compete with the hard vegetable waxes that find great use as polishes, carbon paper, food wrappings, vegetable coatings, and the like. Carnauba wax is the hard wax used principally today and must be imported. A gum free rice wax, on the other hand, is hard and is excellent for polishing, since it can produce a high luster and is a suitable substitute in many instances for the well known hard waxes.

RICE OIL

Rice oil is a desirable by-product from rice processing, because a good quality rice oil possesses qualities not unlike the very popular and highly useful corn oil. Rice oil has been produced in the past and is obtained generally in the form of a crude rice oil by solvent extraction from rice bran that has been conventionally milled from brown rice. Obtaining a satisfactory rice oil from the crude has been attempted in the past and generally involves several refining steps, resulting in a refining loss greatly in excess of the free fatty acid content of the oil. This is a problem peculiar to refining crude rice oil, since with other vegetable oils the expected loss usually amounts to only a few tenths of a percent in excess of the free fatty acid content of the oil. Experience has shown that with a crude rice oil, an expected loss would be about 2½ times the free fatty acid content of the oil. Such an excessive loss of rice oil is caused by an emulsion in the form of a tight, spongy soapstock which occludes much of the refined oil. This emulsion is established from the combination of oil wax and gums when conventional aqueous alkaline solutions are added for refining. Attempts made to correct this loss are generally unsuccessful, although other less serious—but nevertheless substantial—losses result from the following procedure:

(1) The crude oil was heated, hydrated, and then degummed with a commensurate oil loss. Temperatures in excess of normal degumming temperatures had to be maintained in an attempt to keep the wax in solution during degumming. Excessive temperatures in degumming tend to dehydrate gums and force them to return to the solution in the oil, for which reason completely degummed oil was never attained.

(2) The partially degummed oil was slowly chilled and filtered to remove the wax; however, due to the fact that the oil was not previously totally degummed, satisfactory filtering in this stage was a problem, due to the occluded hydrated gummy material which clogged the filters and shortened the filter cycles. This hydrated gum material was retained in the rice wax and—as has been previously set forth—a pure wax product was not obtained, nor was the rice oil completely satisfactory.

(3) The partially gum free oil, then refined by the conventional alkali process, produced further oil loss. The loss in the various steps required to previously refine the rice oil, when added together, produced an overall loss that made the procedure totally uneconomical.

RICE MILLING

The conventional rice milling procedures attempted to produce a clean, white, unbroken rice kernel. The rice kernel with the bran outer layer, referred to as brown rice, when conventionally milled, often results in a loss as high as 25% of the whole kernels in the form of broken pieces, due to the fact that rice is unable to withstand the rigors of the milling process. The milling procedure is necessarily harsh and abrasive, since the bran layer is very tightly held to the rice kernel. To overcome the tenacity of the bran layer to the rice kernel, strong forces must be used to effect their removal. The removal may be attained with various means, such as being forced by a small auger passed through an abrasive screened chamber which houses a high speed rotating eccentric type cylinder that forces the rice against the perforated screened chamber.

Another means for bran removal is to pass the brown rice through a machine which includes a screened chamber having an inner Carborundum cylinder, producing the grinding effect necessary to remove most of the bran layer.

These milling machines can vary the retention time of the rice in the machine, thereby determining the degree of milling. Of course, the greater time the rice is in contact with the abrasive means, the greater the likelihood that breaking of the kernel will occur. Even these machines, however, are not usually sufficient to effect total bran removal and additional scouring, usually in the form of powdered limestone, is used while the rice is passing through the scouring machine.

Though not known to be used commercially, U.S. Patent No. 2,829,055 describes a method of milling rice which uses a solvent such as hexane to loosen the bran layer from the kernel for the removal in a single step substantially all of the fat fraction from the brown rice. The thus defatted brown rice may be subjected to a light milling operation, which is stated to reduce the number of broken rice grains. It has been found, however, that following any of the teachings of this patent, which prefers the removal of at least 70% of the fat fraction from the rice, the miscella produced will contain the gums which—as in prior methods—constitute a great separation problem. This patent, therefore, does not disclose or suggest attempting any separation of the wax from the crude oil or directly from the brown rice. The only importance attributed to the amount of the fat fraction to be extracted is to permit easier milling, and notably only very high fat extraction percentages are recommended. Such a prior art teaching obviously neither relates to nor overcomes the previous problems confronting the art in trying to separate a substantially pure wax as well as rice oil from rice. Moreover, the various heating steps specified in the patent will produce undesirable checking of the grains resulting in the ultimate cracking and breaking of the grains and could not be used as a successful commercial process.

In accordance with the present invention, it has been discovered that the solvent removal of not greater than 10% of the fat fraction of brown rice results in a miscella which possesses essentially all of the rice wax, a correspondingly high wax to oil ratio in the crude rice oil and gums which, as a result of the ratio, are not a hindrance to conventional filtration or centrifuging. It is one of the unique aspects of the present invention that although gums do remain in the crude oil, the ratio of wax to oil has been changed to the extent they do not hinder the crystallization of wax into large particles. Thus, the simple removal of wax from the oil is permitted by any conventional means, such as filtering, although centrifuging is preferred.

An alternate embodiment of the above discovery is the finding that gum free wax alone can be selectively extracted from the brown rice as substantially the entire fat fraction through an extraction process using a miscella having not over 10% oil as the extracting medium. This embodiment successfully relies upon the unique discoveries that (a) when the miscella contains a specified amount of oil and is placed into contact with prepared brown rice, the oil in the miscella will be in equilibrium with the oil in the rice, and consequently there is substantially no oil removed from the rice, but rather the only fat removed from the rice is in the form of rice wax; (b) when the rice wax only is so removed from the brown rice and added to the miscella in an amount not over .4% by weight of the miscella, there are no gums present in the wax enriched miscella, because essentially no rice oil has been removed from the brown rice. By chilling the wax enriched miscella and conventional separating, pure gum free rice wax can be obtained.

The process of the present invention is composed of the several embodiments and also includes numerous important steps which may be generically and briefly summarized as follows:

(a) Preparing brown rice for solvent extraction by evacuation of the interstices through the use of a vacuum;

(b) Contacting the rice with suitable extracting media, such as solvents, including hexane, or specified mixtures of such solvents with rice oil to remove up to 10% of the fats from the rice to obtain a novel miscella which has a very high wax to oil ratio of the wax-oil mixture in the fat fraction removed, and (c) Separating the rice wax from the rice oil by the use of simple separation procedures, and (d) Milling the dewaxed brown rice to obtain a white rice if desired.

FIGURE 2 is a detailed flow sheet for extracting a fat fraction of both oil and wax, and FIGURE 3 is a detailed flow sheet of an alternate embodiment of the present invention showing the selective extraction of rice wax.

Figure 1:
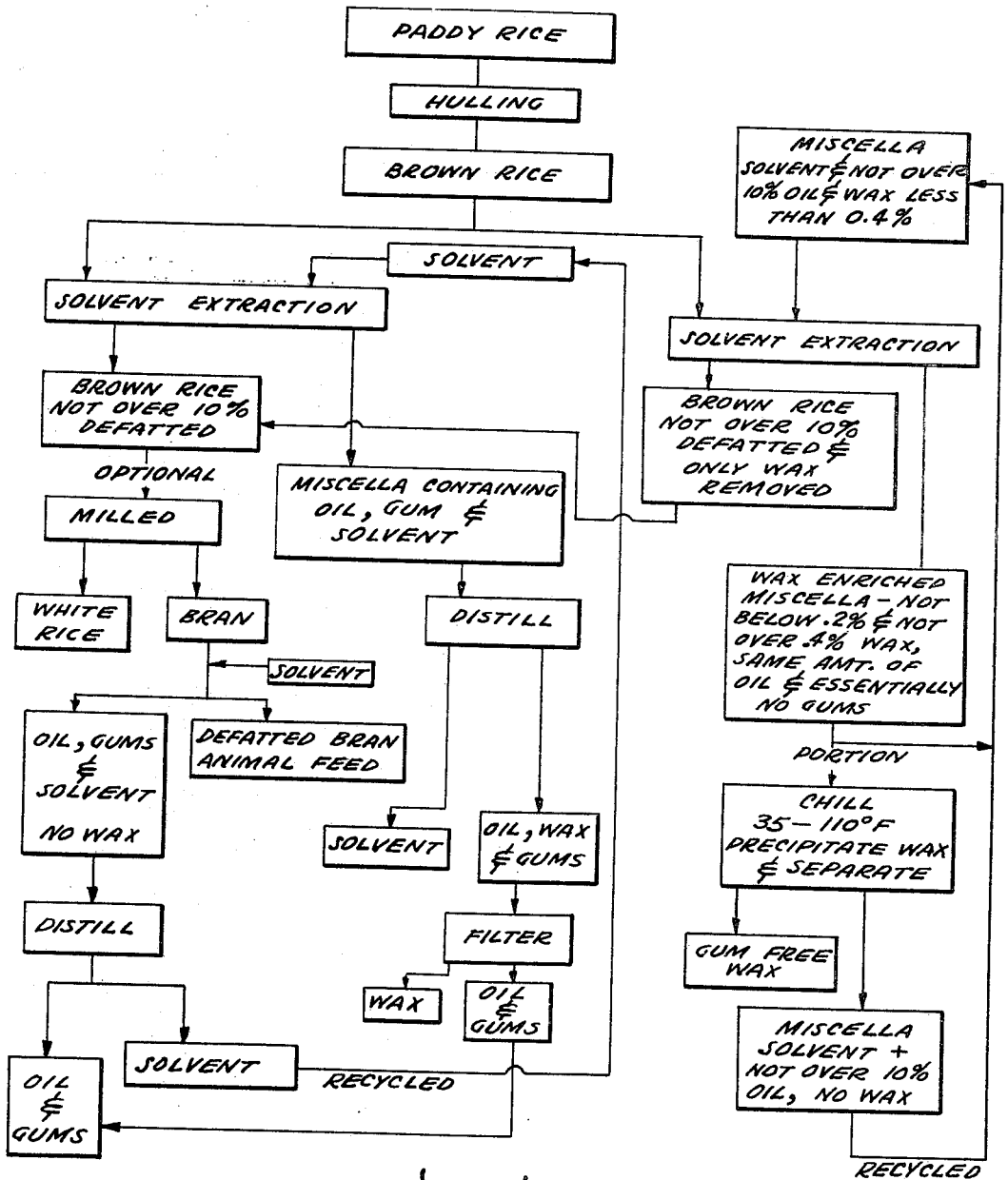
FIGURE 1 is a composite flow sheet of the overall process including many of the variations permitted.

Together with the accompanying drawings the following detailed description will provide a complete understanding of the present invention. Attention is directed to FIGURE 1, which best discloses the variety of steps possible within the scope of this invention and includes each of the various steps which are treated separately hereinafter.

EVACUATION OF THE RICE INTERSTICES

The rough, or paddy rice, which may be parboiled, has the hull removed in the conventional fashion to produce brown rice. Any broken kernels are separated from the whole kernels and the whole kernel, or brown rice, is then thoroughly cleaned of any extraneous foreign material. All of the brokens may or may not be removed from this stage, depending upon the percentage of whole grain desired in the brown rice after processing.

The brown rice is then placed in a suitable treatment tank, generally cylindrical in design, and may be equipped with a conical discharge hopper. The treatment tank must be air tight and sealable to withstand and maintain a vacuum of at least 25 inches of mercury. In actual practice a vacuum of at least 27 inches is preferred.

The purpose of the vacuum is to evacuate the air pockets and the interstices within the rice kernel and especially the starchy endosperm and any voids that exist between the kernel and the bran layers. It has been found that this evacuation of the interstices and voids in the brown rice prepares the rice for the reception of the subsequently applied solvent, which readily enters these evacuated spaces and produces in the shortest possible time the desired removal of the portion (oil and/or wax) of fat fraction desired. Prior to the entrance of the solvent, the rice may be at any temperature, even as high as 140° F., although the application of a vacuum tends to cool the rice, due to the expansion of air and evaporation of any surface moisture.

SOLVENT EXTRACTION OF BOTH OIL AND WAX IN THE FAT FRACTION

In accordance with one embodiment of this invention, the evacuated rice in the treating tank is then subjected to a solvent, hexane being preferred. Other solvents, such as butane, pentane, as well as the halogenated, or particularly the chlorinated hydrocarbon solvents, such as the di- and tri-chlorinated hydrocarbon solvents, including the di- and tri-chlorinated ethylenes and carbon tetrachloride, may be used. Ethyl ether, acetone, alcohols, such as isopropanol, and other solvents have also been used; however, it is found that the lower specific gravity petroleum fractions, particularly hexane, are the most desirable, because of their ease of removal and the absence of any residual taste or odor. When using hexane, the temperature of the entering liquid solvent should be approximately 145° F., which is just slightly below the boiling point at atmospheric pressure of the commercial grade hexane used. The entering temperature is not important, but rather may vary up to 160° F. and down to about 120° F., depending on the pressure in the tank. No matter what solvent is used, its entering temperature should be such that it is liquid, but yet preferably—though not necessarily—near its boiling temperature (S.C.), so that some vaporization occurs in the evacuated chamber. The temperature to which the rice may be subjected is between 125° to 130° F., and is thus a factor in the choice of solvents. Preferably the hexane is admitted at the bottom of the treating tank, as best shown in FIGURE 2. Upon entrance of the liquid hexane in an amount between 5% and 100% of the weight of brown rice, at least a portion of the hexane flash vaporizes, due to the presence of the vacuum. Upon subsequent voiding of the vacuum with the continued inflow of liquid hexane, the rice, cooled partially by the vaporization, will condense substantially all of the hexane previously vaporized. This vaporization and condensation on the rice, as well as the previous evacuation of the interstices and voids of the rice, insures the impregnation of the rice by the hexane and its penetration through the bran to contact the kernel to permit the removal of not more than 10% of the fat fraction. In its broadest aspects, from 2% to 10% of the fat fraction in the rice may be removed from the total fat generally in brown rice of 2% to 4% by weight of the brown rice.

The rice, when contacted with the solvent, should be gradually raised in temperature, rather than rapidly brought near the temperature of the solvent. This gradual change in temperature will aid in the preservation of the whole kernels, while rapid heating could cause some cracks in the grain, which utimately result in a greater percentage of broken kernels.

It is believed, since most or all of the hard fat or wax is present in the bran layer, that it is not necessary—and in fact may be disadvantageous—to permit the soaking of the kernel with solvent. Control of the solvent penetration is achieved by limiting the amount of fat removed to that not over 10%. It has been found that the limitation upon the removal of this specified amount of fat is usually accomplished when the solvent is in contact wtih the rice from 10 to 30 minutes, and preferably 15 minutes. At the end of this time complete solvent impregnation, rather than soaking or saturation of the rice with the solvent, is achieved.

If the rice is soaked with the solvent, the solvent is difficult to remove from the kernel and it is apparent in the milled product. Removal of the solvent from the kernel before milling is possible through use of high temperatures, but in order to completely remove the solvent, such temperatures often result in great stress upon the kernel and subsequent cracking. If, however, no more than 10% of the fat fraction of the rice is removed, there is no soaking and no undesirable solvent penetration.

The solvent, as previously stated, is pumped into the treating tank at the bottom and flows continuously upwardly through the rice and is withdrawn from the top. When the fat content of the miscella is approximately not greater than 10%—and preferably between 6% and 10%—the miscella preferably is removed for distillation. The amount of fat present in the solvent has not been found to affect in any way the penetration of the solvent through the bran and into the kernel of the rice, nor is the extraction quality of the solvent materially reduced, because the solvent making up the miscella has not reached its fat saturation point.

One of the important aspects of the present invention is the discovery that the method of this invention, which includes the removal of up to only 10% of the fat fraction in the brown rice, forms a miscella having a high ratio of at least 30% and up to approximately 100% wax in the wax-oil mixture present in the fat fraction removed. Upon removal of the solvent by simple distillation, the rice wax may be separated from the rice oil easily without any undesirable contamination by the gums, as will be described in detail subsequently. Actually, any gums present in the wax free oil, even though significant, may be permitted to remain in the oil without any disadvantage in certain uses of the oil. This is true particularly in a dry oil where the gums would not at all be apparent. If such gums that are present are desired to be removed, such can be accomplished easily according to conventional methods, which include heating the oil, hydrolyzing the gums, and then separating the degummed oil.

The solvent remaining on the rice after the drawing off of the miscella may, if desired, be removed as a vapor without damage to the rice grain by again sealing the treatment tank and creating one or a series of alternate evacuations up to approximately 27 inches of mercury and air pressurizing. It has been found that more than one such vacuum or air washing is desirable, although the number of washings by use of vacuums or any such washing is not critical or essential. The vaporized solvent hexane is withdrawn and suitably condensed and recycled to extract the brown rice to be subsequently treated.

After the solvent is substantially removed, the rice is discharged from the treating tank into a purge vessel designed similarly to the treating tank, except that it is equipped to provide circulation of air. While the vacuum washings reduce the temperature of the rice somewhat, the rice is nevertheless still quite hot and generally at a temperature of approximately 110° F. to 135° F. and more particularly 125° F. It is the purpose of the purge tank and air flow to gradually cool the rice. Again, it is intended to make any temperature change gradual to preserve the integrity of the rice kernel. The gradual cooling may be achieved by passing air in stages at temperatures from 10° to 20° F. below the approximate temperature of the rice through the rice until the rice is brought to ambient temperature. The passage of air through the rice also tends to remove the last of the residual solvent; however, to be certain of substantially complete removal, the rice may remain in the purge tank for several hours—generally from 1 to 72 hours. At this point the process with respect to the rice is complete and the treated defatted brown rice is ready for transport to storage.

PROCESSING OF MISCELLA TO SEPARATE RICE OIL AND RICE WAX

As best shown in flow diagram of FIGURE 2, the miscella is removed from the treating tank when the miscella reaches a concentration of not greater than 10% by weight oil. The miscella is first passed through suitable mechanical filters to remove any solids such as dirt, pieces of bran, etc., which may form a part of the miscella. After the filtering process, the miscella is then subjected to conventional distillation, in which the hexane or other solvent is suitably removed and the fat fraction, consisting primarily of a crude rice oil containing wax, is retained. The distilled solvent, of course, may be recycled to treat the next batch of brown rice.

One of the novel aspects of the present invention is readily apparent when the analysis of the crude rice oil containing rice oil and wax is found to be composed of a unique ratio approximately 40% to 60%, and usually about 50%, rice wax, and 60% to 40%, and usually about 50%, rice oil, and significantly the gums do not interfere with the separation of the wax from the oil by chilling and filtering.

Therefore, it may be stated that by removal of crude rice oil in an initial extraction stage of no more than approximately 10% fat fraction in the rice, in accordance with the present invention, substantially all of the rice waxes have been removed together with such a reduced amount of oil containing gums that the gums in the product of the present invention do not prevent the separation of the wax from the oil. The reduced quantity of gums may be demonstrated by the fact that when the partially defatted brown rice is milled and the bran recovered, the remaining crude rice oil in the unextracted fat fraction, which is extracted in a second extraction stage from the bran, will be found to contain the major amount of gums, the remaining amount of oil, but significantly no noticeable amounts of rice wax.

Crude oil of the nature and composition, comprising substantially all of the wax and much lower ratio of gums to wax, which is obtained in accordance with the present invention, is at the threshold of achieving the gum free wax through the step of separating wax from the crude rice oil. In the past no one even having a solvent extraction of brown rice which may have extracted as little as 10% of the fat present in the brown rice, recognized or utilized the unique composition as being a source of gum free wax and effected any separation of the wax. U.S. Patent No. 2,829,055, Durrani, represents the extent of the prior art in this respect, and evidences the fact that there was no separation or attempted separation of the wax from the oil.

In accordance with the present invention, the crude rice oil may be chilled between 35° and 110° F., preferably between 40° to 60° F., to slowly form wax crystals, and after chilling, it may be successfully filtered to remove the wax. By filtering with any conventional filter media or by centrifuging with standard commercial centrifuges, the filtrate or liquid fat, substantially entirely in the form of rice oil, is obtained. At 60° F. the portion separable by filtering constitutes approximately 50% liquid fat by weight and approximately 50% solid fat by weight.

The filtrate in the form of the liquid portion of the total extracted fatty matter and representing 60% of all extracted fatty matter is less than 10% of the total fatty matter present in the brown rice. When the wax is separated from the oil, there is obtained a chocolate brown colored hard wax which is not tacky, and when applied to smooth surfaces can be polished to a high luster.

If for any reason it is desired to remove any gums from the oil, the gums may be removed by heating the oil, adding water to the gum oil mixture to hydrolyze the gums, and then separating the hydrolyzed gums from the oil.

SELECTIVE SOLVENT EXTRACTION OF WAX

Selectively extracting wax substantially without oil and therefore without the presence of gums forms an alternate embodiment of the present invention and is related to the previously described process of extracting both the wax and the oil from the rice and differs primarily in the utilization of a miscella of oil and solvent as the extracting medium to extract only wax from the brown rice. FIGURE 3 graphically illustrates the flow diagram of this facet of the invention.

It has been discovered when the extracting medium is in the form of the miscella of oil and solvent that it is possible to extract wax only substantially without any oil if the extracting medium contains oil in an amount less than 10% by weight of miscella. It has been found that within the contact time of 10 to 30 minutes and corresponding temperatures of the miscella of 160° to 120° F., an equilibrium is created between the oil in the miscella and the oil in the brown rice, so that little or no oil is removed from the rice during the equilibrium. Such an equilibrium is rapidly reached with an oil concentration of approximately 5% to 6% by weight of the miscella. An important aspect of such equilibrium is that wax only is leached out from the rice and separated from the gums.

The gums, it is believed, are more soluble in the rice oil present in the brown rice and therefore remain in the rice rather than become extracted in the miscella. Further, it has been found that even if the miscella has an oil content below the equilibrium point of 5% to 6% by weight oil, resulting in some pickup of additional oil, it is unexpectedly found that this pickup rice oil will not contain any significant amount of gums to contaminate the extracted waxes.

As long as the miscella never reaches a concentration greater than 10% oil, rice wax will be extracted continuously from the brown rice; however, it has been discovered that in order to prevent any noticeable gum removal, the concentration of the wax in the miscella must be at a maximum of 0.4% by weight of the miscella. Preferably, the amount of wax should be about 0.2% to 0.3% in the miscella. As soon as the wax concentration 0.2% is reached—or a maximum of 0.4%—the wax rich miscella, or portion thereof, should be removed from the overflow stream and the miscella dewaxed to lower the wax concentration of the total miscella.

The dewaxing procedure of the wax rich miscella to obtain gum free wax may be accomplished by chilling the miscella to a temperature between 35° and 110° F., preferably 40° to 60° F., at which time wax crystals form and drop out of the solution in the miscella. The chilled miscella is then centrifuged and filtered and the crystallized pure gum free wax product removed.

The dewaxed miscella, containing not more than 10% oil, and preferably about 4% to 7% oil, as well as a low wax concentration, is recycled to a holding tank from which the main miscella stream originates, as shown in FIGURE 3.

The extraction of the wax can be in a batch process in which the wax concentration of the miscella is carefully checked to avoid extracting wax in an amount greater than the 0.4% maximum. Above this limit some of the gums would contaminate the wax. The miscella should be continuously removed and dewaxed and added to the same brown rice until all of the wax from the brown rice has been extracted. In a continuous process the procedure would be essentially the same, except that the miscella can be admitted at the bottom of the tank holding the brown rice and continuously removed as an overflow stream from the top, from which overflow at least a portion is dewaxed.

MILLING OF THE DEFATTED BROWN RICE

Brown rice contains 2% to 4% fat, including oils and waxes. The oil is distributed throughout the bran layers present in the kernel of the rice. The wax, however, is primarily contained in the outer bran layers, and it is believed that the removal of the wax from the rice—and in particular from the bran layers—produces a more millable brown rice which requires far less friction and none of the abrasive additives, such as limestone, and the like. It is believed, since the waxes are present principally in the outer bran layers, that the extraction of the wax from these bran layers alone produces the more effective milling of the rice.

The defatted rice, in accordance with the present invention, characteristically possesses a loosened bran on the brown rice kernel and these bran layers are very easily removed by light abrasive action effected by a scouring machine which may be of a conventional type, but which requires far less time and therefore results in considerably less broken grains. After the brown rice has been passed through a scouring machine to remove the bran, the rice may be admitted to polishing brushes to remove any minute bran layers remaining. These polishing brushes are conventional and aside from removing the bran, they have a polishing or smoothing effect. Such brushes are usually composed of large revolving cylindrical drum stripped with leather strips which brush against a mesh wire cage fitted close around the rotating drum. As the drum revolves at high speed, the rice is fed between the drum and mesh wire cage producing a mild abrasive action which removes bran and polishes the rice.

In accordance with the present invention, brown rice produced in accordance with either one of the foregoing embodiments—that is, rice having some portion of the fat removed—can be treated exactly the same in the milling machine.

DEFATTED BRAN TREATMENT

The bran thus removed from the milled brown rice can then be treated, if desired, in a conventional manner, using conventional solvents, such as hexane, to extract the remaining fat and gums to produce a defatted bran usable for animal feed.

The extracted materials from the bran, including oil, solvent, and gums without wax, may then be distilled to recover the solvent. The remaining oil and gums may be usable as clear oil, or may be degummed in a conventional manner. The oil thus produced in accordance with the present invention has a clear color that in the past was unattainable in previous conventional methods of extraction, the previous crude oil being too dark to be read on a Gardner scale. The color of the oil, whether obtained from the miscella containing the extracted oil in one embodiment of the present invention, or the oil which is extracted from the defatted bran, in accordance with either embodiment of the present invention, is clear, light, and easily readable on the Gardner scale, usually having a reading of from 9 to 11. The following examples illustrate the invention and are not to be construed as limiting the scope or spirit of the invention:

Example I

A 100-lb. sample of brown rice was admitted to a treating tank and the pressure was reduced to 3 in. Hg absolute to evacuate the interstices of the rice. Then 20 lbs. of hexane at 150° F. was forced into the tank from the bottom and circulated for 15 minutes to extract .269 lb. (8.97%) of fatty material from a total available fat of 3 lbs. This fat was heated and filtered to remove any extraneous material.

After heating and allowing to cool to room temperature, the fat was slowly chilled to 50° to 60° F. and held at that temperature for 3 hours. It was then vacuum filtered without difficulty. The solid cake of wax crystals, retained on the filter was pulled to dryness as nearly as possible and the two portions were weighed. It was found that the liquid portion (rice oil) represented 64.3% of the total extracted fat and the solid portion (rice wax) represented 35.7% of the total extracted fat.

The liquid portion was tested with the following results:

(1) Color _____ Gardner__ 11
(2) Cloud point _____ ° F__ 42
(3) Moisture _____ percent__ 0.08
(4) Acetone insoluble _____ do____ 22.96
(5) Acetone soluble _____ do____ 77.04

The solid fat portion was taken into solution in 10 to 12 volumes of boiling 99% isopropyl alcohol. The hot mixture was slowly cooled to room temperature and then held overnight at 26° C. The cooled solution was filtered to remove the wax. No gums were found to be present in the wax and the wax was hard and non-tacky.

Example II

The procedure of Example I was followed and 10% of the total fat content of brown rice was removed by hexane extraction, separated, and analyzed to determine the physical and chemical qualities of the fat separated under these conditions.

Separation was accomplished by heating the fat to 130° C., filtering hot and allowing to cool slowly. After the fatty material reached room temperature, it was further slowly chilled to 50° to 60° F. and held at this temperature for 3 hours and filtered at this temperature to physically separate the two components. By weight, this physical separation yielded 47.97% solid fat and 52.3% liquid fat.

The liquid portion of the oil was tested and found to have the following characteristics:

(1) Color _____ Gardner__ 11–12
(2) Cloud _____ ° F__ 43
(3) Moisture _____ percent__ 0.05
(4) Acetone insoluble matter _____ do____ 28.13
(5) Acetone soluble matter _____ do____ 71.87

The solid portion retained on the filter was crystallized once from 99% isopropyl alcohol by first heating to solution and then cooling to wax crystallization. The cooled solution was filtered by vacuum to remove the solids. The wax cake resulting from this filtration was freed of alcohol and weighed. Again no gums were found in the hard wax.

BRAN EXTRACTION

Example III

When commercial rice bran is extracted with hexane, there results crude oil containing 3% to 9% solid material and of a color too dark to read on a Gardner scale. This is the crude oil which in the past has made subsequent up-grading of the material so costly to the point of being uneconomical. As a comparison, two 100-lb. lots of brown rice were extracted as in Examples I and II, above. After this primary extraction, the lots of defatted brown rice were milled in the commercial pearler and brushed with a laboratory brush. All the bran from each lot was collected and tested separately.

The bran was extracted with commercial hexane and the hexane evaporated to result in bran oil. These two samples of oil were tested for the two factors which in the past have made crude rice oil hard to process and dispose of in an economical way. The results follow:

| Bran Oil Example No. | Gardner Color | Solids by Volume Content at R.T., percent |
|---|---|---|
| I | 10 | 0.10 |
| II | 10–11 | 0.12 |

The solids content of the oil was determined by centrifuging 100 cc. of the dry oil at room temperature. The decant was substantially freed from solids.

This example demonstrates that extraction of the bran oil subsequent to the primary extraction of about 10% of the total fat present in the bran of brown rice would result in an oil which is similar to the extracted crude vegetable oils on the market today.

Example IV

After evacuation of the brown rice as in Example I, 70 lbs. of a miscella having 1.9% fatty matter, primarily in the form of rice oil present and including hexane at 140° F. was admitted to the bottom of the treating tank with 94.5 lbs. of brown rice containing 3.95% total fat. The miscella was permitted to overflow the top of the tank and was at a temperature of approximately 130° F. The miscella was circulated for approximately 15 minutes, during which time the oil in the miscella was in approximate equilibrium with the oil in the brown rice. Approximately 10% of the overflow stream of miscella, containing 2.2% by weight total fatty matter, was withdrawn from the miscella holding tank and was filtered while hot to remove all extraneous material. The resulting miscella was a brilliantly clear product at elevated temperature and contained 1.57 lbs. of fat. The miscella was then chilled to 46° F., when wax crystals formed and dropped out of the solution in an amount of .203 lb. of wax. The miscella, after extraction, contained 1.33 lbs. of fat as oil. The total solid content of the miscella was .29%. It was found that along with the wax, .035 lb. of oil was removed, which, together with the .203 lb. of wax constituted .238 lb. of total fat removed. This removed fat is 6.39% of the total fat available in the brown rice. Of the total fat removed, 85.3% is wax. The miscella was then centrifuged to remove crystal wax from the wax poor miscella. The oil-hexane mixture, having approximately the same composition as initially used in the treating tank, was recycled to the miscella tank for continued usage.

Example V

The procedure is identical with that of Example IV, with miscella of the same composition and amount and applied to 94 lbs. of brown rice having 3.47% total fat. The miscella, after extraction, contained 2.23% by weight of total fat and a solid content of .31%. .217 lb. of wax was extracted, along with .13 lb. of oil. The total fat removed constituted 7.06% of the total fat present in the brown rice. The wax was hard and of good grade.

Example VI

The procedure of Example IV was followed and 70 lbs. of miscella, containing 2.37% fatty matter was used to extract 92 lbs. of brown rice having 3.92% total fat. The miscella, after extraction, contained 2.76% by weight fat and included a solid content of the miscella of .39%. A total of .27 lb. of fat was removed, all of which was wax, no oil having been found. The total fat removed, all of which was wax, was 6.89% of the total fat available. The wax obtained was acceptable in all respects.

It should be manifest that the main objects of the present invention have been achieved by the embodiments of the processes described.

From the foregoing detailed description, it will be evident that there are a number of changes, adaptations, and modifications of the present invention which come within the province of those skilled in the art; however, it is intended that all such variations not departing from the spirit of the invention be considered as within the scope thereof as limited solely by the appended claims.

We claim:

1. The process of separating the rice wax from the rice gums in brown rice grains having a bran coating thereon comprising:

forming a vacuum around each brown rice grain to evacuate the interstices and voids of said grain, contacting said rice grains with a liquid extracting medium for said wax, said extracting medium being selected from the group of alkanes having 4 to 6 carbon atoms, chlorinated alkanes having 1 to 2 carbon atoms, isopropanol, ethyl ether and acetone, extracting not more than 10% of the fat fraction present in said rice grains to form a wax rich miscella including a substantial portion of all of the waxes present in said rice grains, and separating the wax from said miscella by chilling to form a gum free wax.

2. The process of claim 1, wherein said liquid extracting medium consists essentially of a substantially pure solvent and wherein the temperature of the solvent is below its boiling temperature.

3. The process of claim 2, wherein the solvent is hexane at an entering temperature of 150° F.

4. The process of claim 1, wherein the solvent is hexane and is in contact with said rice grains for a time between 10 and 30 minutes and at a temperature between 120° F. and 160° F.

5. The process of claim 1, wherein the wax rich miscella has a wax content of 40% to 60% of the fat in said miscella.

6. The process of claim 1, wherein said miscella has a maximum wax concentration of 0.4% by weight of the miscella.

7. The process of separating the rice wax from the rice gums in brown rice grains having a bran coating thereon comprising: forming a vacuum around each brown rice grain to evacuate the interstices and voids of said grain, contacting said rice grains with a liquid extracting medium for said wax, said liquid extracting medium being a wax poor miscella containing an amount of rice oil and a solvent, said amount of rice oil being not greater than 10% by weight of said miscella, said miscella also containing not greater than 0.4% by weight rice wax, said solvent being selected from the group of alkanes having 4 to 6 carbon atoms, chlorinated alkanes having 1 to 2 carbon atoms, isopropanol, ethyl ether and acetone, and wherein said wax rich miscella is substantially gum free, extracting not more than 10% of the fat fraction present in said rice grains to form a wax rich miscella including a substantial portion of all of the waxes present in said rice grains, and separating the wax from said miscella by chilling to form a gum free wax.

8. The process of claim 7, wherein said wax poor miscella contains from 6% to 10% by weight rice oil and less than 0.2% rice wax.

9. The process of claim 7, including extracting into said wax poor miscella substantially wax only from said rice grains to form a wax rich miscella substantially free of gums and withdrawing at least a portion of said wax rich miscella and recovering a gum free wax from said wax rich miscella.

10. The process of claim 7, wherein the solvent is hexane.

11. The process of claim 7, including extracting into said wax poor miscella substantially wax only from said rice grains to form a wax rich miscella substantially free of gums, maintaining the maximum concentration of wax in said miscella during wax extraction at 0.4% by weight of wax rich miscella while continually withdrawing at least a portion of said wax rich miscella and recovering a gum free wax from said wax rich miscella.

12. The process of claim 7, including establishing an equilibrium between the oil in said extracting medium and oil in said rice grains and extracting into said wax poor miscella substantially wax only from said rice grains to form a wax rich miscella substantially free of gums.

13. The process of claim 12, wherein the equilibrium is established at about 6% to 7% oil in the miscella.

14. The process of claim 12, wherein the solvent is hexane.

15. The process of claim 12, wherein the wax poor miscella is at a temperature of 120° F. to 160° F. and is in contact with the rice grains for a time between 10 and 30 minutes.

16. A miscella for use in selectively extracting rice wax from brown rice, comprising: (a) a quantity of rice oil, (b) a solvent for rice oil and rice wax in brown rice grains, and (c) rice wax in an amount not greater than 0.4% by weight, said quantity of rice oil being up to 10% by weight of said miscella, and said solvent being selected from the group of alkanes having 4 to 6 carbon atoms, chlorinated alkanes having 1 to 2 carbon atoms, isopropanol, ethyl ether and acetone.

17. The miscella of claim 16, wherein the rice oil is present in the amount of 4% to 7% by weight of the miscella and the wax is present in the amount of 0.2% to 0.3% by weight of the miscella.

18. The miscella of claim 16 consisting essentially of rice oil in the amount of 4–7% by weight miscella, wax in the amount of 0.2–0.3% by weight miscella, and the remainder the solvent hexane.

References Cited

UNITED STATES PATENTS

| | | | |
|---|---|---|---|
| 1,438,194 | 12/1922 | Stokes | 260—412.4 XR |
| 2,680,754 | 6/1954 | Stapelberg | 260—412.4 |
| 2,829,055 | 4/1958 | Durrani | 260—412.4 XR |
| 2,990,255 | 6/1961 | Mickus et al. | 260—412.4 XR |

OTHER REFERENCES

Pominski et al., Ind. & Eng. Chem., vol. 47, pp. 2109–2111, 1955.

LEON ZITVER, Primary Examiner

HOWARD T. MARS, Assistant Examiner

U.S. Cl. X.R.

99—80; 252—364